United States Patent Office 2,754,221
Patented July 10, 1956

2,754,221

METHOD OF TREATING GLASS FIBERS WITH A COMPOSITION INCLUDING COLLOIDAL SILICA AND ARTICLE PRODUCED THEREBY

Remus F. Caroselli, Manville, R. I., assignor to Owens-Corning Fiberglas Corporation, a corporation of Delaware No Drawing. Application January 31, 1952,
Serial No. 269,350

11 Claims. (Cl. 117—46)

This invention relates to the production of new glass fiber products and to methods for producing the same.

This application is a continuation-in-part of my copending application Ser. No. 101,495, filed on June 25, 1949, and now abandoned.

In many ways, glass fibers constitute an ideal material for textile fabrics, such as are used in dress goods, draperies, curtains, insulations and the like, or as a fibrous base in coated fabrics and reinforced plastics. Yet, full utilization of glass fibers for such purposes has suffered for a number of reasons, some of which have to do with characteristics or properties developed incident to other desirable treatments of the glass fibers.

For instance, upon attenuation, glass fibers form naturally into fine rod-like filaments having perfectly smooth and slippery surfaces. The low surface coefficient of friction permits the glass fibers to move relative to each other on the slightest provocation. As a result, glass fiber fabrics often fray quite badly and special precautions are required to prevent seams and sewn edges from pulling out.

Hand and draping qualities in glass fibers and fabrics formed therefrom suffer from the slippage of the yarns caused by the smooth glass surfaces, and this tendency to slippage militates against the use of glass yarns for some light weight fabrics, such as marquisettes, and the slippage is often detrimental even in heavier fabrics.

The smooth, non-porous surfaces of glass fibers provide little anchorage for coating or coloring compositions. This also tends to limit the use of the fabrics, since both color and design constitute essential characteristics for textile materials. Those that might be coated or colored through the medium of a resinous base or the like, are subject to color diminution. More important, the coating is often easily removed under high humidity conditions, because the hydrophylic characteristics that predominate on the glass fiber surfaces preferentially attract water and under high humidity conditions, an intervening moisture layer may be induced which relaxes the bond between the coating and the glass fiber surfaces.

It has been found that the slippage and colorability of glass fibers may be markedly improved by the treatment which includes the application of finely-divided silica to the glass fiber surfaces, followed by a heat treatment, which is instrumental in the development of a proper bond between the silica with the glass fiber surfaces in a manner which resists removal or separation from the glass fiber surfaces, as an incidence to normal handling.

The silica treatment operates not only to deluster the fiber to a desired degree and to reduce the slippage of the fibers in the fabric, but permanent coloring of glass fibers and fabrics can be achieved by conventional means. Thus the product formed therefrom is delustered colorable glass fiber having a coefficient of friction such that undesirable slippage between fibers does not take place. A fabric prepared in accordance with this invention will be characterized by softness; draping and hand qualities of the finest silks; it will be wrinkle and crease resistant; it may be given a permanent color or design; its luster may be regulated to meet the needs for a particular application; and weave slippage is also reduced to permit the use of glass fibers in light weight textile fabrics.

By way of illustration, but not of limitation, the following defines a method for carrying out this invention.

*Example 1.*—A fabric woven of continuous-type glass fibers is submerged in an aqueous suspension containing about 15 per cent colloidal silica ($SiO_2$). The treated fabric, the fibers of which are substantially completely coated with the silica composition, is dried and then it is subjected to heat treatment at a temperature of 1050–1250° F. for two to three seconds, but may be exposed for as long as thirty minutes. At this temperature range, the organic substances, usually applied as a size to the attenuated glass fibers, are almost immediately burned or distilled off. To prevent carbonization, which deposits discoloring substances that are thereafter difficult to remove from the glass fiber surfaces, it is desirable to carry out heat treatment under oxidizing conditions. Such conditions are indicated by burning-off with a bluish flame and it may be maintained by permitting free flow of air to the burning zone or by the injection of oxygen or oxygen-enriched gases. At this temperature, it also appears that the moisture layer invariably present on the glass fiber surfaces, is substantially eliminated.

Thus by the elimination of size and by the conjoint removal of the moisture layer from the glass fiber surfaces, bone dry conditions exist which favor intimate association of the silica particles with the siliceous materials of the glass fiber composition. This suggests the possible formation of entirely new reaction products on the glass fiber surfaces from which the desirable characteristiscs are derived. This might explain the ability, on the one hand, of easily removing silica dust heretofore applied as a delustrant to the glass fiber surfaces, as compared to the relative inability of removing the silica reacted on the glass fiber surfaces in accordance with this invention.

The reacted silica which appears to be more or less integrated with the glass fiber surfaces provides some degree of protection against mutual abrasion between fibers, but it is expedient to follow heat treatment almost immediately with a coating of lubricant or protectant and a curing step for the coating if indicated.

Treatment in accordance with this invention is not restricted to fabrics woven of continuous glass fibers, but may be applied to staple fibers or continuous glass fibers, or fabrics formed therefrom. It may also be practiced with certain combinations of glass fibers with other fibrous materials capable of withstanding the processing temperature, for example, asbestos.

It will be understood that the solids content of silica in the treating composition may be increased or decreased beyond the 15 percent concentration of Example 1, depending upon the method of application, the concentration which it is desired to deposit in the glass fiber surfaces, and the degree of delustering desired in the fibers or fabric. Thus the solids content of silica in the treating composition may vary from 1 to 30 percent by weight or more.

Instead of impregnation of the fibers by submerging the fabric in a bath of the aqueous suspension, application of the silica-containing composition may be made by a padder or by other conventional process such as flow coating, spraying, brushing, dip-squeeze, and the like.

As pointed out in the example, it is usually convenient to dry the treated fabric or fibers prior to heat treatment. This enables the desired heat treatment to be effected at a later date, and even at a distant station. However, coating and heat treatment may, if desired, be out as a continuous operation. Air drying will suffice to remove the diluent from the treated fabric, but evaporation of the diluent may be hastened by exposure to elevated temperatures not to exceed heat treatment temperature for a short time.

Temperatures suitable for heat treatment are capable simultaneously of fiber relaxation and weave setting. Suitable heat treating temperatures range from 400° F. to about 50° below the fusion temperature for the particular glass composition, but it is preferable to carry out heat treatment between 800 and 1250° F., especially with a borosilicate glass composition. The time of exposure depends primarily on the temperature of heat treatment and it may vary proportionately from 50 or more hours at 400° F. to two to three seconds at 1250° or 1300° F.

Lubrication of the glass fibers after heat treatment with the silica on the surfaces thereof may be effected with a wide variety of materials. It is preferred to lubricate the glass fibers with an organo-silicon compound of the type described in the Biefeld Patent No. 2,392,805 or other silanes or their polymerization products, hereinafter referred to as polysiloxanes. The most desirable organo-silicon compounds for lubrication and coating of the treated glass fibers may be selected of the low molecular weight polysiloxanes of fluid consistency or the higher molecular weight polysiloxanes of waxy or resinous character. Representative of suitable polysiloxanes are dimethyl polysiloxane, lauryl methyl polysiloxane, methyl octadecyl polysiloxane, which are fluids ranging from 50 to over 150 centistokes velocity. Suitable organo-silicon lubricating materials may also be selected of such copolymers as dimethyl, phenyl, methyl polysiloxanes, or methyl ethyl, phenyl and methyl polysiloxane, which are waxy or resinous members. Silanes which may be used include octadecyl trichlorosilane, didodecyl dichlorosilane, and the like.

*Example 2.*—A glass fiber fabric treated in accordance with Example 1 may be coated with a composition containing from 1 to 5 percent of lauryl methyl polysiloxane having a viscosity of 1500 centistokes in solution with toluene. The treated fibers are then heated to a temperature of 550 to 650° F. for 20 minutes to set the organo-silicon on the glass fiber surfaces.

*Example 3.*—Instead of lauryl methyl polysiloxane, the glass fibers treated in accordance with Example 1 may be dipped in a solvent solution containing from 2 to 10% by weight of didodecyl dichlorosilane, followed by heat treatment at a temperature of 600° F. for 15 minutes.

*Example 4.*—A fabric treated in accordance with Example 1 may be immersed in a solvent solution of methyl ethyl phenyl and methyl siloxane resin present in concentrations ranging from 1 to 10% by weight. The fabric, after immersion in the polysiloxane bath, may be passed over squeeze rolls to remove excess therefrom and then baked at a temperature of 750° F. for 20 minutes.

Instead of, or in combination with, the lubrication of the treated glass fibers, protective agents may be applied onto the treated glass fiber surfaces by way of a coating resin or the like, selected of materials which are primarily organic in nature. such, for example, as the thermosetting resinous materials of the type phenol-formaldehyde or other phenol-aldehyde, urea-aldehyde, melamine formaldehyde, polyester resins, including allyl and vinyl derivatives thereof, and copolymers thereof. Instead, use may be made of thermoplastic materials, with or without plasticizer as polystyrene, polyacrylic acid derivatives, including polymethyl methacrylate, ethyl methacrylate, and the like, polyvinyl esters such as polyvinyl acetate, polyvinyl chlorides and copolymers of vinyl acetate and vinyl chloride, cellulose ethers and esters such as cellulose acetate, cellulose trilate, ethyl cellulose, and the like, natural and synthetic rubbers, and natural resins such as shellac, gelatin, casein, and the like.

*Example 5.*—A fabric prepared in accordance with Example 1 may be coated with an aqueous dispersion containing 4 percent by weight polyvinyl acetate. The coating composition may be applied by means of a padder or by a dip-squeeze process in amounts sufficient to coat the fibers, or, in the event that a coated fabric is desired, the resinous material may be applied in higher concentrations in amounts to fill the interstices of the fabric. After application of the resinous coating composition, the coating may be set by heat treatment at a temperature of about 300 to 450° F. for 10 to 30 minutes.

*Example 6.*—A fabric treated in accordance with Example 1 may subsequent to heat treatment be coated with a 3 to 6 percent butadiene-acrylonitrile elastomer in aqueous dispersion. Heat treatment to set the elastomer on the treated glass fiber surfaces may be carried out at temperatures ranging from 300 to 450° F. for 10 to 20 minutes.

Materials primarily lubricating in character may also be used alone or in combination with the polymeric materials described. These include oils, waxes, cationic active amine compounds of the type described in the Sloan Patent No. 2,356,542, Werner complex compounds of the type described by Iler in Patent No. 2,273,040, and the like.

When used in combination with the treated materials previously described as in Examples 2 to 7, such lubricants may be embodied in amounts ranging from 0.5 to 2% by weight of the treating composition.

*Example 7.*—Instead of polyvinyl acetate, the fabric produced by Example 1 may be flow coated with a composition containing 5% water solution of a phenol formaldehyde resin reacted to an intermediate stage of polymeric growth and a 1% dispersion of sulfonated mineral oil. Resinous cure can be achieved by subsequent treatment of the fabric at a temperature of 350° F. for 20 to 30 minutes.

In the manufacture of textiles, it is desirable to deposit a relatively low concentration of the coating or of the protective agent on the heat treated glass fiber surfaces. The lower limit of concentration corresponds to an amount sufficient to cover the surfaces with at least a monomolecular film, and may consist of as little as 0.5% by weight of the coated fabric. The upper limit of concentration corresponds to that which will not undesirably stiffen the fibers in the fabric or tend to bind the fibers as an adhesive. Usually the upper limit of concentration is 2% by weight, but up to 10% by weight may be used, especially when the coated material is predominantly lubricating or plasticizing in character. To secure this low concentration in uniform distribution, application is preferably made by conventional means from diluted compositions which may employ organic solvents to effect solution, or water or incompatible liquids to effect emulsion or dispersion.

When coating materials primarily organic in character are applied, best practice calls for a subsequent treatment of the fabric at a temperature below 400° F. for driving off the diluent and for setting the material on the treated glass fiber surfaces. When the materials applied are substantially inorganic in character, such as the organo-silicons, heating to set the material on the glass fiber surfaces may be conducted at considerably higher temperatures within the range of 400° to 900° F., but preferably within the range of 550° to 650° F. By regulating the amount of coating material, the type of coating material, and the degree or extent of heat treatment, the characteristics of the resulting fibers may be varied from silky softness to a starchy stiffness, such as is often desired for draperies, curtains, or other hangings. Heat treatment at the temperatures described may be conducted for a period of time ranging from one to thirty minutes or more.

As previously pointed out, one of the important advantages of this invention resides in the possibility of incorporating coloring materials in a permanent fashion onto the glass fiber surfaces. Coloring may be achieved by the usual techniques for dyeing and printing as employed in the textile trade. Suitable dyes include methyl violet, Victoria blue, malachite green, brilliant green, rhodamine dye and thioflavine, or acid dyes of the type nigrosine dye, or induline dyes or lake-forming pigments such as the alizarine dyes, lithol red, Para red, toludine red, Hansa yellow, Ponsol blue, phthalocyanine dye, syan blue, Monastral blue, alizarine cyclamine, amaranth, and the like. Suitable inorganic pigments which may be incorporated by aqueous dispersion or in suitable resinous carriers include cadmium red, chrome yellow, molybdate orange, Paris green, ultramarine blue, cobalt blue, carbon black, and various coloring metal oxides which will hereinafter be described. This invention also provides for permanent coloring of glass fibers as an incidence to the fabrication steps. For example, coloring oxides may be incorporated with the silica in the treating composition for substantial integration with the glass fiber surfaces upon heat treatment.

Heat treatment of the type employed in this invention is not harmful to the inorganic coloring metal oxides, but by proper selection of temperature in the heat treating step, the resulting color developed can be varied through specific color ranges. For example, nickel oxide incorporated with the silica in amounts ranging from 5 to 20% by weight thereof will develop a greenish-blue color responsive to mild heat treatment on the glass fiber surfaces, while exposure for ten minuates at 600° to 650° F. will cause a color change to an attractive grayish-yellow hue. Iron oxide is also illustrative of a material which may be heat treated to introduce various colors. Chromium oxide, which imparts a blue color, and cobalt oxide, which imparts a pink color when used alone in combination with the silica, may be blended together in various proportions to provide shades varying from violet to green-blue. Lead oxide gives a deep yellow when blended with antimony oxide. The combination of chromium, iron, and zinc oxide gives colors ranging from yellow-brown to red-brown to maroon. Cadmium provides a yellow color, and copper and chromium oxide provide a blue-black color. Other shades and complementary colors may also be developed by mixing various metal oxides in desirable proportions.

The following example will illustrate the practice of coloring glass fibers by the introduction of a coloring metal oxide as an ingredient in combination with the silica for coating the glass fibers, followed by heat treatment to integrate the particles onto the glass fiber surfaces in a manner to provide the described characteristics and also to impart permanent color to the fibrous structure.

*Example 8.*—A woven fabric of glass fibers is submerged into an aqueous dispersion containing 20% by weight colloidal silica and 4% by weight nickel oxide. The coated fabric is dried and then heat treated at a temperature of about 850 to 950° F. for one to three minutes. Heat treatment is carried out under oxidating conditions so as more completely to burn off any size which may previously have been applied to the fiber surfaces and to maintain the metallic components as the corresponding oxide. The resulting fabric has the silica particles apparently strongly bonded to the glass fiber surfaces and the nickel oxide imparts a yellowsh-green color over the entire surface of the fabric. It will be understood that the metal oxides introduced to impart color may be varied in composition and in concentrations within amounts ranging from 2 to about 20% by weight of the treated composition and that the metal oxides may be applied to the glass fiber surfaces prior to heat treatment in combination with the silica or in a treatment separate and apart therefrom.

An important concept of this invention resides in the development of a permanent color on the glass fiber surfaces as an incidence to the thermal reaction for coordinating the silica particles with the glass fiber surfaces. It has been found that certain metallic salts, when reacted on the glass fiber surfaces in combination with the silica particles under the conditions of heat treatment previously described, form a colored reaction product, the color of which depends greatly upon the metallic component of the salt, its concentration, and the conditions of heat treatment.

In practice, it is preferred to make use of organo metallic salts because, under the conditions of heat treatment, it is believed that the organic component is driven off and that the metallic component remains to form the corresponding coloring oxide or to form a colored reaction product uniformly distributed over the glass fiber surfaces. Suitable organo metallic compounds which may be incorporated in solvent solution or in aqueous dispersion include salts such as the naphthanates, benzoates, acetates, rosinates, resinates, and salts of other aliphatic, aromatic, and keto-aromatic acids such as the formates, propionates, phenylates, and the like. Use may also be made of compounds wherein the metallic component is to be found in the anionic group, such as the stannates, molybdates, arsonates, arsonites, chromates, plumbates, and the like. The metallic component of the organo metallic compounds hereinabove described may be selected of a polyvalent metal such as copper, chromium, cobalt, nickel, manganese, lead, arsenic, uranium, iron, bismuth, vanadium, cadmium, silver, silenium, zinc, and the like. Representative salts include cobalt naphthanates, nickel naphthanates, lead rosinates, copper rosinates, chromium phenylates, zinc acetates, iron naphthanates, cadmium rosinates, and the like.

Organo metallic compounds of the type described may be applied from solvent solution prior to or subsequent to the application of the silica, or they may be applied as a dispersion in combination therewith to form a single treating composition. Solvents for salts of the type described include Stoddard solvent, xylene, toluene, naphtha, coal tar products, petroleum solvents, aromatic solvents, ethers, esters, ketones, and the like. Permanent color results when application is made of compositions containing from 0.2 to 20% by weight of the organo metallic compound.

Instead of organo metallic salts and the like, coloring reaction products may also be developed by the use of inorganic metallic salts in corresponding concentrations applied from solvent solutions but preferably applied in aqueous dispersion in combination with the silica to form a single treating composition. Representative of the inorganic metallic salts which may be used are metals of the type previously described as one component in combination with radicals to form corresponding chlorides, iodides, nitrates, sulfates, chromates, stannates, and the like, such, for example, as ferric chloride, cupric chloride, stannic chloride, silver nitrate, chromium chloride, lead chromate, and the like.

*Example 9.*—In the use of color-forming metallic salts in combination with silica in the treatment of glass fibers to develop a permanent color in a fabric having characteristics of the type described, a woven fabric of continuous glass fibers is submerged in an aqueous dispersion containing 12% colloidal silica and 4% ferric chloride. The treated fabric is dried and then subjected to a heat treatment at a temperature of 1100 to 1200° F. for about five seconds. As a result of this treatment, a fabric is formed having a brownish-red tinge throughout and characterized by the desirable properties heretofore described as resulting from the heat treatment of glass fibers with silica deposited thereon. The colored fabric may be treated with a 4% solution of lauryl methyl polysiloxane as a protective agent, followed by baking at a temperature of about 500 to 650° F. for ten to twenty minutes.

*Example 10.*—A woven fabric of continuous glass fibers may be coated with an aqueous dispersion containing 15% colloidal silica and 3% of a dispersion of nickel naphthanate which has been incorporated as a 70% solution of nickel naphthanate in Stoddard solvent. The treated fabric is light blue in color, but upon heat treatment at a temperature of about 950 to 1050° F. for 1 to 2 minutes, a yellowish-green coloration is formed throughout the surface.

The colored fabric having the particles of silica integrated with the surfaces thereof may be lubricated as a continuous operation by immersion in an aqueous medium containing 2% by weight mineral oil followed by baking at a temperature of about 350° F. for 10 to 15 minutes.

*Example 11.*—Instead of coating the colored fabric produced in accordance with example 10 with an oil lubricant, the fibers of the fabric may be immersed in a bath containing 4% by weight polyvinylidene chloride in solution, followed by heat treatment at a temperature of 300 to 400° F. for 15 minutes.

Glass fibers treated in the manner described to provide an over-all color continue to be highly receptive to other coloring agents such as the dyes and the pigments previously described, whereby coloring and printing of the fibers or fabric may be carried out by conventional processes well-known in the trade as applied to ordinary textile fabrics formed of cotton, wool, silk, and the like. The ability to print onto a glass fiber fabric or to color a glass fiber fabric by after treatment in the manner described herein as permitted by fibers treated in accordance with the inventive concepts herein described, provide a marked advance in the application and use of glass fibers in the textile trade and constitutes an important phase of this invention.

Coloring materials may, instead of being incorporated with the silica or applied after the silica treatment by the techniques which have heretofore been described, be incorporated as an ingredient with the coating compositions applied to the silica-coated fibers after heat treatment. When incorporated in the coating compositions, such, for example, as in the lubricant or in the organo silicon compounds or in the resinous protective agents, the coloring agents may be compounded therein as in a paint, or the like. By limiting the baking temperature of the coated fibers to between 300 to 400° F., ordinary coloring agents such as dyes and pigments may be used. With the organo silicons which are tolerant of considerably higher temperatures, the coloring agents incorporating therewith may be selected of the more heat-stable coloring agents such as the metal oxides or the metal salts, which can be converted to coloring reactive products at the elevated temperature for baking. Suitable concentrations of the coloring agent in the respective coating compositions may be selected to meet the particular needs, but, ordinarily, concentrations in the range of 2 to 10% by weight of a dye or 2 to 20% by weight of pigment, may be used.

It will be understood that invention herein lies in the silica-treated glass fibers and the method for producing same, as well as in the silica-treated glass fibers having coloring agents, protective agents, and lubricants incorporated therein, and methods for manufacturing same. It will be further understood that changes may be made in the techniques of application and treatment without departing from the spirit of the invention, especially as defined in the following claims.

I claim:

1. In the preparation of a glass fiber product, the step of heating glass fibers with colloidal silica and polyvalent metallic salt having a metallic component the oxides of which are colored distributed over the surfaces at a temperature within the range of 50° F. below the fusion temperature for the glass composition of which the fibers are formed to 400° F. whereby the salt is converted to the colored oxide and the silica becomes strongly bonded to the glass fiber surfaces.

2. In the preparation of a glass fiber product, the steps of heating glass fibers with colloidal silica and an organo salt of a polyvalent metal deposited on the surfaces thereof for at least 3 seconds to 50 hours varying proportionately with a temperature ranging from 50° F. below the fusion temperature for the glass composition of which the fibers are formed to 400° F. whereby the salt is converted to the colored oxide.

3. In the method for coloring glass fibers, the step of heating glass fibers with colloidal silica and an organic salt of a polyvalent metal having coloring oxides deposited on the surfaces thereof for at least 3 seconds to 50 hours varying proportionately with a temperature ranging from 50° F. below the fusion temperature for the glass composition of which the fibers are formed to 400° F. whereby the salt is converted to the colored oxide.

4. In the preparation of colored glass fibers, the steps of heating glass fibers with colloidal silica and an organic salt of a polyvalent metal having coloring oxides on the surfaces thereof for 3 seconds to 30 minutes at a temperature ranging from 1250° to 800° F. whereby the salt is converted to the colored oxide.

5. In the preparation of a glass fiber product, the steps of treating glass fibers with a composition containing from 1 to 30 percent by weight colloidal silica and 0.2 to 20 percent by weight of a metallic salt formed of a polyvalent metallic component having coloring oxides to deposit silica particles and the salt on the glass fiber surfaces, and treating the heated fibers for at least 3 seconds to 50 hours proportionately with a temperature ranging from 50° F. below the fusion temperature for the glass composition of which the fibers are formed to 400° F. whereby the salt is converted to the colored oxide.

6. The method of coloring glass fibers as claimed in claim 3 which includes the additional step of coating the colored glass fiber surfaces with an organic film forming material, and then setting the organic film forming material on the glass fiber surfaces for protection.

7. The method of coloring glass fibers as claimed in claim 3 which includes the additional step of coating the glass fibers with an organic lubricant.

8. The method of coloring glass fibers as claimed in claim 3 which includes the additional steps of coating the glass fibers with an organo-silicon compound, and then baking the coated fibers at elevated temperature to set the organo-silicon compound on the glass fiber surfaces.

9. The method of coloring glass fibers as claimed in claim 3 which includes the additional step of coating the glass fibers with an organic film forming polymer, and then heating the coated fibers to set the polymer on the glass fiber surfaces.

10. Colored glass fibers produced by the method of claim 1.

11. Colored glass fibers produced by the method of claim 7.

References Cited in the file of this patent

UNITED STATES PATENTS

| Number | Name | Date |
|---|---|---|
| Re. 19,372 | Walton | Nov. 13, 1934 |
| 2,215,150 | Hannen | Sept. 17, 1940 |
| 2,526,684 | Powers | Oct. 24, 1950 |
| 2,577,936 | Waggoner | Dec. 11, 1951 |
| 2,593,817 | Waggoner | Apr. 22, 1952 |